United States Patent
Frangenberg

(10) Patent No.: US 10,001,173 B2
(45) Date of Patent: Jun. 19, 2018

(54) TWO-ROLLER ROLL PRESS WITH THRUST BEARING CONSTRUCTION

(71) Applicant: TAKRAF GMBH, Leipzig (DE)

(72) Inventor: Meinhard Frangenberg, Kürten-Engeldorf (DE)

(73) Assignee: TAKRAF GMBH, Leipzig (DE)

( * ) Notice: Subject to any disclaimer, the term of this patent is extended or adjusted under 35 U.S.C. 154(b) by 160 days.

(21) Appl. No.: 14/956,517

(22) Filed: Dec. 2, 2015

(65) Prior Publication Data

US 2016/0160927 A1   Jun. 9, 2016

(30) Foreign Application Priority Data

Dec. 3, 2014   (DE) .................. 10 2014 224 734

(51) Int. Cl.
*B30B 3/04*   (2006.01)
*F16C 35/04*   (2006.01)
(Continued)

(52) U.S. Cl.
CPC .............. *F16C 35/042* (2013.01); *B02C 4/02* (2013.01); *B02C 4/28* (2013.01); *B30B 3/04* (2013.01); *F16C 13/02* (2013.01); *F16C 19/30* (2013.01); *F16C 19/545* (2013.01); *F16C 35/061* (2013.01); *F16C 35/063* (2013.01); *F16C 19/542* (2013.01); *F16C 35/067* (2013.01)

(58) Field of Classification Search
CPC .. B30B 3/04; B30B 9/20; B30B 9/202; B02C 4/02; B02C 4/28; F16C 19/30; F16C 35/042; F16C 35/061; F16C 35/063; F16C 35/067; F16C 13/02; F16C 19/542; F16C 19/545; F16C 23/00; D21F 3/06; D21F 3/08; B21B 28/00; D21G 1/02

See application file for complete search history.

(56) References Cited

U.S. PATENT DOCUMENTS 3,782,796 A * 1/1974 Rickley ................. B21B 31/074
    384/584
4,286,830 A * 9/1981 Salter, Jr. .............. B21B 31/074
    384/584

(Continued)

FOREIGN PATENT DOCUMENTS

DE     2035698 B2   9/1979
DE     37 28 389 A1   3/1989

(Continued)

OTHER PUBLICATIONS

European Office Action dated Jan. 14, 2016.

*Primary Examiner* — Jimmy T Nguyen
(74) *Attorney, Agent, or Firm* — McGlew and Tuttle, P.C.

(57) ABSTRACT

A two-roller roll press, with a machine frame, has two rollers, which have shaft journals at respective axial ends of the rollers for mounting in a bearing construction. At least one of the rollers is mounted at one or both shaft journals in a thrust bearing construction. The thrust bearing construction has a thrust bearing, a thrust bearing housing ring, an outer thrust bearing cap and a bearing cap. The thrust bearing is shrunk onto a shaft journal. The thrust bearing housing ring and the bearing cap are detachably connected into one unit, which is in turn fastened detachably to the thrust bearing cap, which is in turn detachably fastened to the bearing housing.

16 Claims, 1 Drawing Sheet

(51) Int. Cl.
*F16C 19/30* (2006.01)
*B02C 4/02* (2006.01)
*B02C 4/28* (2006.01)
*F16C 35/06* (2006.01)
*F16C 13/02* (2006.01)
*F16C 35/063* (2006.01)
*F16C 19/54* (2006.01)
*F16C 35/067* (2006.01)

(56) References Cited

U.S. PATENT DOCUMENTS

| | | | |
|---|---|---|---|
| 4,915,024 A | 4/1990 | Wanke | |
| 5,211,487 A * | 5/1993 | Hannon | B21B 31/07 384/540 |
| 6,149,309 A * | 11/2000 | Wojtkowski, Jr. | B21B 31/074 384/276 |
| 6,575,638 B2 * | 6/2003 | Martins | B21B 31/074 384/559 |
| 7,082,800 B1 * | 8/2006 | Muller | B21B 31/074 29/260 |
| 7,386,939 B2 * | 6/2008 | Di Giacomo | B21B 31/074 29/252 |
| 7,857,522 B2 * | 12/2010 | Osgood | B21B 31/074 384/276 |

FOREIGN PATENT DOCUMENTS

| | | |
|---|---|---|
| DE | 86 08 228 U1 | 8/1989 |
| DE | 101 36 201 A1 | 2/2003 |
| DE | 102 61 758 A1 | 1/2004 |
| GB | 2 188 684 A | 10/1987 |
| GB | 2188684 A | 10/1987 |
| WO | 03/022471 A1 | 3/2003 |
| WO | 03022471 A1 | 3/2003 |

* cited by examiner

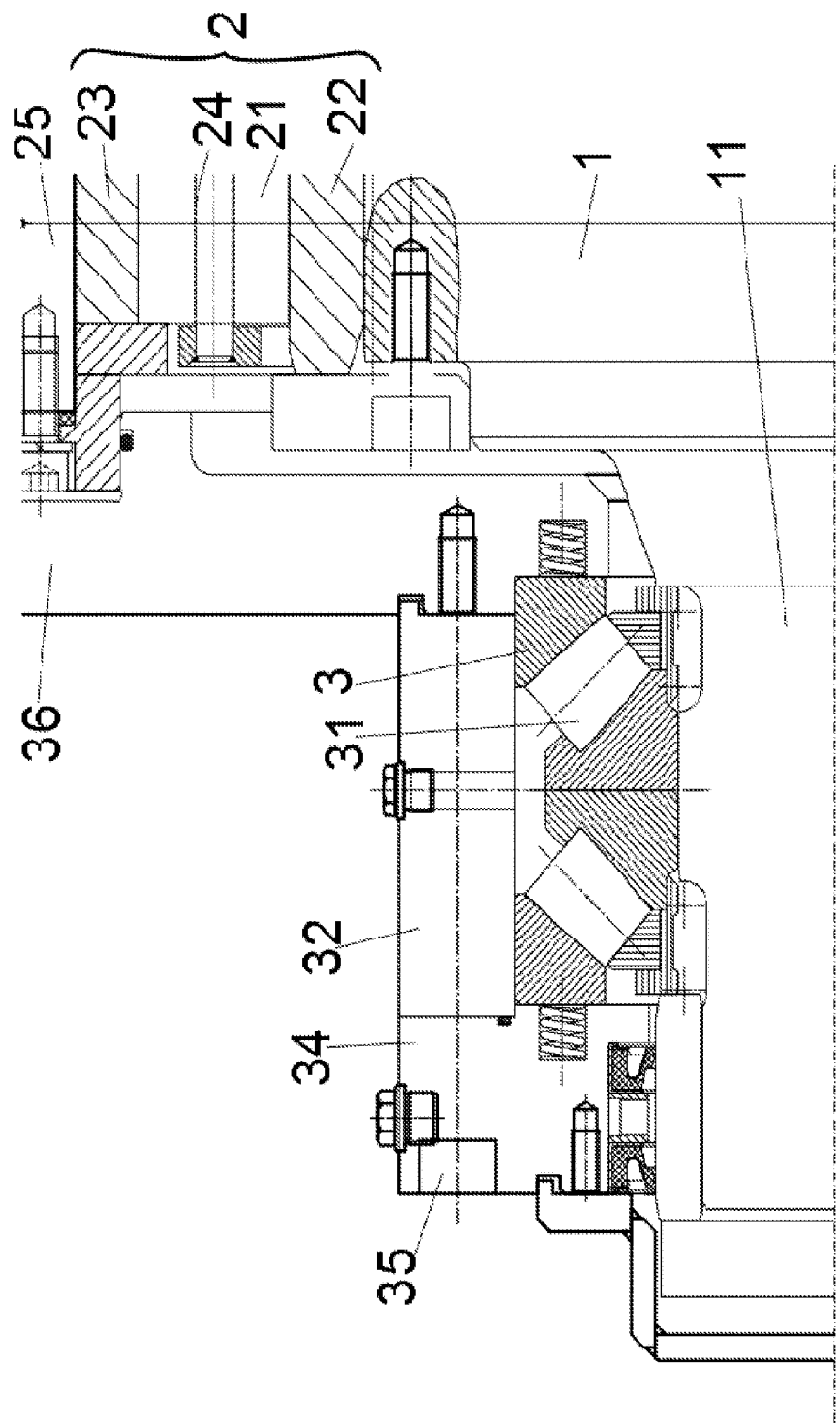

TWO-ROLLER ROLL PRESS WITH THRUST BEARING CONSTRUCTION

CROSS REFERENCE TO RELATED APPLICATIONS

This application claims the benefit of priority under 35 U.S.C. § 119 of German Patent Application DE 10 2014 224 734.9 filed Dec. 3, 2014, the entire contents of which are incorporated herein by reference.

FIELD OF THE INVENTION

The present invention pertains to a two-roller roll press with thrust bearing construction, wherein the rolls have shaft journals. At least one of the shaft journals of each roll has a thrust bearing, which absorbs axially acting forces and thus prevents an axial displacement of the roll. The rolls also have a radial bearing in addition to the axial bearing.

BACKGROUND OF THE INVENTION

One of the two rolls of two-roller roll presses is frequently designed as a fixed roll, whose bearing is supported directly on the machine frame, while the second (loose roll) has force-exerting elements (hydraulic cylinders, spring constructions) between the bearings and the machine frame. These force-exerting elements generate the pressing forces and enable the loose roller to yield if the opposing force of the material to be ground exceeds the maximum pressing force. In case of a non-parallel roll gap, the loose roller will be in an oblique position and axial forces will thus develop, which must be absorbed by at least one thrust bearing in order to prevent a displacement of the roll.

Spherical roller bearings, which can also absorb axial loads, in addition to radial ones, are therefore used in the state of the art. Other embodiments in the state of the art make provisions for using, instead of spherical roller bearings, multi-row cylindrical roller bearings, but these are unable to absorb any axial forces. These cylindrical roller bearings are therefore complemented by axial supports, which absorb the axial forces. Thrust bearings are, in particular, suitable for use as a support. The conventional roll bearing thus comprises a fixed bearing, a combination of cylindrical roller bearing and self-aligning roller thrust bearing, on one side of the roll and a cylindrical roller bearing as a movable bearing, preferably on the drive side of the roll.

The thrust bearings are preferably fastened on the shaft journal by means of shrinking. The thrust bearings are heated for this purpose and will become firmly seated on the shaft journal due to the heat shrinking after cooling.

However, this form of construction proved to be disadvantageous, because the service lives and the resulting intervals between which the roll surfaces need to be replaced are markedly shorter than the intervals at which the thrust bearings need to be replaced. This means that whenever the roll bearing is removed for maintenance of the roll surface or for replacing the roll, the thrust bearing also has to be pulled off from the shaft journal thereof in a complicated procedure and pulled again over the shaft journal of the replacement roller. This problem is solved by DE 101 36 201 A1, which proposes that the thrust bearing be shrunk on the ring cap-like cover plate of the bearing rather than on the shaft. This assembly unit is then pushed, with the "outer thrust bearing cap" mounted, over the shaft journal with a slight clearance and screwed to same axially. A co-rotating ball race, which runs against non-co-rotating gasket rings and thus brings about a sealing of the roller bearing, is provided on the outer side of the cover plate.

Practical experience has shown that this thrust bearing mount construction does not meet the requirements and problems arise time and time again because of cooling water leaks at the flat packing between the assembly unit and the plane of the screw connection at the shaft journal. It is, furthermore, problematic that the outer thrust bearing cap with its ring-shaped thrust bearing housing shape projecting in breadth was manufactured as a cast part (more cost-effective than a welded part), which led to complicated production with relatively high costs. The mounting and removal of the thrust bearing is also more complicated than desired because of the large number of fitting tolerances.

In another embodiment known from the state of the art, the thrust bearing and the ball race are shrunk, due to the design, tightly onto the shaft. The one-part "outer thrust bearing cap" made of a casting is mounted in advance. For removal, e.g., in case of a roll replacement, the thrust bearings shrunk in pairs onto the shaft must be pulled off with a pulling device to be manufactured specifically for this purpose, together with the "outer thrust bearing cap," without suitable preheating (thrust bearings are seated enclosed on three sides in the outer thrust bearing cap). This procedure is time-consuming because of the tight seating of the part and the difficulty or impossibility of heating the thrust bearings.

SUMMARY OF THE INVENTION

Thus, an object is to overcome the drawbacks of the state of the art and to provide a two-roller roll press with a thrust bearing construction, which also solves the sealing problem, in addition to the possibility of easy assembly and can be easily purchased and manufactured worldwide.

According to the invention, a two-roller roll press is provided comprising a machine frame, two rollers, each of the rollers comprising shaft journals at roller axial ends for mounting in a bearing construction, the shaft journals being fastened in the machine frame and a thrust bearing construction for mounting one of the shaft journals of one of the two rollers. The thrust bearing construction comprises a thrust bearing, a thrust bearing housing ring, an outer thrust bearing cap and a bearing cap. The thrust bearing is shrunk onto the one of the shaft journals and the thrust bearing housing ring and the bearing cap are detachably connected into one unit, the one unit is detachably fastened to the outer thrust bearing cap and the outer thrust bearing cap is detachably fastened to the bearing housing.

A two-roller roll press, in which the thrust bearing housing and a bearing cap are connected into one unit, is provided according to the present invention. This connection is preferably effected by screwing. The rest of the embodiment of the two-roller roll press corresponds to prior-art constructions known from the state of the art.

In one embodiment, the outer thrust bearing cap and the thrust bearing housing are manufactured of sheet metal.

In the sense of the present application, the thrust bearing cap designates the component of the roll that defines the thrust bearing in the direction of the center of the roll. This is often the cap which covers the plain bearings. The bearing cap designates in the sense of the present invention the component that defines the thrust bearing in the direction of the shaft end and is screwed to the thrust bearing housing according to the present invention.

Contrary to DE 101 36 201 A1, the thrust bearing is seated directly on the shaft rather than on the ring cap-like cover plate. The fastening is carried out according to the prior-art procedure by means of shrinking the thrust bearing onto the shaft journal. The thrust bearing is thus seated directly on the shaft journal rather than on the ring cap-like cover plate. The outer thrust bearing cap and the detachably fastened (screwed-on) housing ring for mounting the outer components of the thrust bearing can be manufactured from sheet metal, based on the advantageous geometric design, and thus they can be advantageously purchased and manufactured worldwide.

The preferably ring-shaped thrust bearing housings are fastened detachably to the outer thrust bearing cap, preferably by screwing, in the solution according to the present invention.

The construction according to the present invention advantageously reduces the number of components. It makes possible free access to the shaft seat with the ring-shaped thrust bearing housing removed and the outer thrust bearing cap removed, which makes it possible to heat shrink the thrust bearing during mounting. After unscrewing the thrust bearing housing ring, the thrust bearing is freely accessible for removal, which makes it possible to heat the thrust bearing for pulling off from the thrust bearing cap. No cost-intensive cast thrust bearing caps are advantageously used, but simple sheet metal constructions are used, instead, which can be manufactured more easily and purchased or manufactured everywhere. It is especially advantageous that the thrust bearing can be checked (state of wear) without having to be removed. The separation site within the bearing between the media lubricant and cooling water and the problematic sealing thereof against one another is eliminated in the construction according to the present invention. This becomes possible especially due to the elimination of the flat packing, which is compressible and shall compensate added tolerances, which represents a problematic dual function of this flat packing.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a schematic view showing a section through the thrust bearing construction of the two-roller roll press according to the present invention. Only the section up to the axis of rotation of the roll is shown.

DESCRIPTION OF THE PREFERRED EMBODIMENTS

The following exemplary embodiment describes a preferred embodiment of the thrust bearing construction of the two-roller roll press according to the present invention, but without the present invention being limited to this.

A roll press roller 1 is mounted via a roll press roller shaft journal 11 in a multi-row cylindrical roller bearing 2 with bearing inner raceway 22, bearing outer ring 23, roller bodies 21, pin cage 24 and additional structural elements that are according to the state of the art. The rolling bearing 2 is arranged with its outer ring 23 in the bearing housing 25, which is received, in turn, by the machine frame of the high-pressure roll press (two-roller roll press).

The thrust bearing construction has two thrust bearings 3, preferably self-aligning roller thrust bearings in an X arrangement, with thrust bearing rollers 31, a thrust bearing housing ring 32, a thrust bearing cap 36 and a bearing cap 34. The thrust bearing 3 is shrunk onto the shaft journal 11. The thrust bearing 3 is surrounded by the ring-shaped thrust bearing housing ring 32 in the circumferential direction. This thrust bearing housing ring 32 consists of sheet metal. The bearing cap 34 covers the thrust bearing in the direction of the shaft journal end and closes the entire construction against ambient effects. The thrust bearing outer side of the fixed bearing contains, among other things, the outer thrust bearing cap 36 and the thrust bearing housing ring 32, which is fastened to the outer thrust bearing cap 36 with screws (a screw connection) via the bearing cap 34. This thrust bearing construction forms an envelope for the shaft end and the thrust bearings 3. It is especially advantageous that only the fastening screws 35 must be loosened to make it possible to remove the bearing cap 34 and the housing ring 32 and inspect the thrust bearing 3.

While specific embodiments of the invention have been shown and described in detail to illustrate the application of the principles of the invention, it will be understood that the invention may be embodied otherwise without departing from such principles.

APPENDIX

List of Reference Numbers

1 Roll press roller
11 Shaft journal
2 Cylindrical roller bearing
21 Roller body
22 Bearing inner raceway
23 Bearing outer ring
24 Pin cage
25 Bearing housing
3 Thrust bearing
31 Thrust bearing rollers
32 Thrust bearing housing ring
34 Bearing cap
35 Common screw connection of bearing cap and thrust bearing housing ring
36 Outer thrust bearing cap

What is claimed is:

1. A two-roller roll press comprising:
   a roller comprising shaft journals at roller axial ends for mounting in a bearing construction; and
   a thrust bearing construction for mounting one of the shaft journals of the roller, the thrust bearing construction comprising a thrust bearing, a thrust bearing housing ring, an outer thrust bearing cap and a bearing cap, wherein the thrust bearing is shrunk onto the one of the shaft journals, the thrust bearing housing ring and the bearing cap being detachably connected into one unit, wherein the one unit is detachably fastened to the outer thrust bearing cap and the outer thrust bearing cap is detachably fastened to a bearing housing.

2. The two-roller roll press in accordance with claim 1, wherein the outer thrust bearing cap of the thrust bearing construction is manufactured from sheet metal.

3. The two-roller roll press in accordance with claim 2, wherein the thrust bearing housing ring of the thrust bearing construction is manufactured from a sheet metal ring.

4. The two-roller roll press in accordance with claim 2, further comprising a screw connection wherein the detachable connection of the thrust bearing housing ring and bearing cap into one unit is brought about by the screw connection.

5. The two-roller roll press in accordance with claim 2, further comprising an outer thrust bearing cap screw connection wherein the detachable connection of the thrust bearing housing ring and bearing cap to the outer thrust bearing cap is brought about by the outer thrust bearing cap screw connection.

6. The two-roller roll press in accordance with claim 2, further comprising a common screw connection wherein the detachable connection of the thrust bearing housing ring and the bearing cap into one unit and also the detachable connection of the unit comprising the thrust bearing housing ring and the bearing cap to the outer thrust bearing cap are brought about by the common screw connection, which connects all three components to one another.

7. The two-roller roll press in accordance with claim 1, wherein the thrust bearing housing ring of the thrust bearing construction is manufactured from a sheet metal ring.

8. The two-roller roll press in accordance with claim 7, further comprising a screw connection wherein the detachable connection of the thrust bearing housing ring and bearing cap into one unit is brought about by the screw connection.

9. The two-roller roll press in accordance with claim 7, further comprising an outer thrust bearing cap screw connection wherein the detachable connection of the thrust bearing housing ring and bearing cap to the outer thrust bearing cap is brought about by the outer thrust bearing cap screw connection.

10. The two-roller roll press in accordance with claim 7, further comprising a common screw connection wherein the detachable connection of the thrust bearing housing ring and the bearing cap into one unit and also the detachable connection of the unit comprising the thrust bearing housing ring and the bearing cap to the outer thrust bearing cap are brought about by the common screw connection, which connects all three components to one another.

11. The two-roller roll press in accordance with claim 1, further comprising a screw connection wherein the detachable connection of the thrust bearing housing ring and bearing cap into one unit is brought about by the screw connection.

12. The two-roller roll press in accordance with claim 11, further comprising an outer thrust bearing cap screw connection, wherein the detachable connection of the unit to the outer thrust bearing cap is brought about by the outer thrust bearing cap screw connection.

13. The two-roller roll press in accordance with claim 11, wherein the screw connection is a part of a common screw connection, wherein the detachable connection of the thrust bearing housing ring and the bearing cap into one unit and also the detachable connection of the unit comprising the thrust bearing housing ring and the bearing cap to the outer thrust bearing cap are brought about by the common screw connection, which connects all three components to one another.

14. The two-roller roll press in accordance with claim 1, further comprising an outer thrust bearing cap screw connection, wherein the detachable connection of the thrust bearing housing ring and the bearing cap to the outer thrust bearing cap is brought about by the outer thrust bearing cap screw connection.

15. The two-roller roll press in accordance with claim 14, wherein the outer thrust bearing cap screw connection is a part of a common screw connection wherein the detachable connection of the thrust bearing housing ring and the bearing cap into one unit and also the detachable connection of the unit comprising the thrust bearing housing ring and the bearing cap to the outer thrust bearing cap are brought about by the common screw connection, which connects all three components to one another.

16. The two-roller roll press in accordance with claim 1, further comprising a common screw connection wherein the detachable connection of the thrust bearing housing ring and bearing cap into one unit and also the detachable connection of the unit comprising the thrust bearing housing ring and the bearing cap to the outer thrust bearing cap are brought about by the common screw connection, which connects all three components to one another.

* * * * *